United States Patent
Efremov et al.

(10) Patent No.: US 12,079,286 B2
(45) Date of Patent: Sep. 3, 2024

(54) SYSTEM AND METHOD OF SELECTION OF A MODEL TO DESCRIBE A USER

(71) Applicant: AO Kaspersky Lab, Moscow (RU)

(72) Inventors: Andrey A. Efremov, Moscow (RU); Pavel V. Filonov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 853 days.

(21) Appl. No.: 17/120,348

(22) Filed: Dec. 14, 2020

(65) Prior Publication Data
US 2021/0397981 A1 Dec. 23, 2021

(30) Foreign Application Priority Data

Jun. 19, 2020 (RU) .......................... RU2020120454

(51) Int. Cl.
*G06Q 30/00* (2023.01)
*G06F 16/951* (2019.01)
(Continued)

(52) U.S. Cl.
CPC ........ *G06F 16/9535* (2019.01); *G06F 16/951* (2019.01); *G06F 18/214* (2023.01);
(Continued)

(58) Field of Classification Search
CPC .. G06F 16/9535; G06F 16/951; G06F 18/214; G06N 5/025; G06N 20/00; H04L 67/535
See application file for complete search history.

(56) References Cited

U.S. PATENT DOCUMENTS

2005/0203878 A1  9/2005  Brill
2006/0156326 A1  7/2006  Goronzy et al.
(Continued)

OTHER PUBLICATIONS

Lin Qingsong, "A novel mobile multimedia service method based on user interest model," 2010 The 2nd Conference on Environmental Science and Information Application Technology, Wuhan, China, 2010, pp. 687-690, doi: 10.1109/ESIAT.2010.5568443. (Year: 2010).*
(Continued)

*Primary Examiner* — Sun M Li
(74) *Attorney, Agent, or Firm* — ArentFox Schiff LLP; Michael Fainberg

(57) ABSTRACT

Disclosed herein are systems and methods for selection of a model to describe a user. In one aspect, an exemplary method comprises, creating data on preferences of the user based on previously gathered data on usage of a computing device by the user and a base model that describes the user, wherein the base model is previously selected from a database of models including a plurality of models, determining an accuracy of the data created on the preferences of the user, wherein the determination is based on observed behaviors of the user, when the accuracy of the data is determined as being less than a predetermined threshold value, selecting a correcting model related to the base model, and retraining the base model, and when the accuracy of the data is determined as being greater than or equal to the predetermined threshold value, selecting the base model to describe the user.

24 Claims, 5 Drawing Sheets

(51) Int. Cl.
*G06F 16/9535* (2019.01)
*G06F 18/214* (2023.01)
*G06N 5/025* (2023.01)
*G06N 20/00* (2019.01)
*H04L 67/50* (2022.01)

(52) U.S. Cl.
CPC ............ *G06N 5/025* (2013.01); *G06N 20/00* (2019.01); *H04L 67/535* (2022.05)

(56) References Cited

U.S. PATENT DOCUMENTS

| | | | | |
|---|---|---|---|---|
| 2008/0104004 | A1* | 5/2008 | Brave | G06F 16/9535 706/45 |
| 2011/0078323 | A1 | 3/2011 | Wooden | |
| 2011/0082824 | A1* | 4/2011 | Allison | G06Q 10/10 706/46 |
| 2011/0125700 | A1* | 5/2011 | Funada | G06F 11/3447 706/50 |
| 2011/0161308 | A1 | 6/2011 | Andersen et al. | |
| 2011/0282954 | A1 | 11/2011 | Flake et al. | |
| 2012/0239613 | A1* | 9/2012 | Danciu | G06Q 10/06 707/603 |
| 2013/0218824 | A1* | 8/2013 | Wang | G06N 5/02 706/46 |
| 2015/0032672 | A1* | 1/2015 | Prieditis | G06N 20/00 706/12 |
| 2015/0039315 | A1 | 2/2015 | Gross | |
| 2015/0339754 | A1* | 11/2015 | Bloem | G06F 16/9535 705/26.7 |
| 2015/0347437 | A1* | 12/2015 | Marti | G06Q 30/02 707/731 |
| 2017/0185901 | A1* | 6/2017 | Farahat | G06N 5/04 |
| 2019/0197395 | A1* | 6/2019 | Kibune | G06N 3/08 |
| 2019/0318257 | A1* | 10/2019 | Gould | G06N 5/022 |
| 2020/0134469 | A1* | 4/2020 | Choo | G06N 3/084 |

OTHER PUBLICATIONS

Sung Young Jung, Jeong-Hee Hong and Taek-Soo Kim, "A statistical model for user preference," in IEEE Transactions on Knowledge and Data Engineering, vol. 17, No. 6, pp. 834-843, Jun. 2005, doi: 10.1109/TKDE.2005.86. (Year: 2005).*

B. Liu et al., "Content-Oriented User Modeling for Personalized Response Ranking in Chatbots," in IEEE/ACM Transactions on Audio, Speech, and Language Processing, vol. 26, No. 1, pp. 122-133, Jan. 2018, doi: 10.1109/TASLP.2017.2763243. (Year: 2017).*

A. Filieri, G. Tamburrelli and C. Ghezzi, "Supporting Self-Adaptation via Quantitative Verification and Sensitivity Analysis at Run Time," in IEEE Transactions on Software Engineering, vol. 42, No. 1, pp. 75-99, Jan. 1, 2016, doi: 10.1109/TSE.2015.2421318. (Year: 2016).*

Matteo Dell'Amico, Maurizio Filippone, Pietro Michiardi, and Yves Roudier, "On User Availability Prediction and Network Applications", IEEE/ACM Transactions on Networking, vol. 23, No. 4, Aug. 2015. (Year: 2015).*

* cited by examiner

SYSTEM AND METHOD OF SELECTION OF A MODEL TO DESCRIBE A USER

CROSS REFERENCE TO RELATED APPLICATIONS

The present application claims priority to Russian Patent Application No. 2020120454, filed on Jun. 19, 2020, the entire content of which is incorporated herein by reference.

FIELD OF TECHNOLOGY

The present disclosure relates to the field of data analysis and machine learning. Specifically, to systems and methods for selection of a model to describe a user and for creating individualized content for users of services.

BACKGROUND

The rapid development of computer technologies in the last decade, as well as the widespread use of various computing devices (personal computers, notebooks, tablets, smartphones, and so forth), have become a powerful stimulus for the use of those devices in different areas of activity and for an enormous number of tasks (from Internet surfing to bank transfers and managing electronic documentation). In conjunction with the growth in the number of computing devices and the volume of the software running on these devices, rapid growth has occurred in the numbers of: malicious programs, methods of unsanctioned access to data being processed by those devices, and the number of fraudulent ways of utilizing such data.

Thus, matters of information security are becoming especially important. Much attention is starting to be devoted not only to ensuring the information security of the personal data of users, but also to protecting the personal data of users against hypothetical (often even rather unlikely) threats such as successful targeted attacks on servers storing the personal data of users and so forth. Overtime, the added attention has resulted in solutions based on the concept of voluntary consent. For example, in the European Union, a general data protection regulation or GDPR has been introduced for this purpose. In another example, solutions which ensure a maximum volume of personal data of users is stored on the computing devices of users and a minimum amount of analysis and use of that data is performed for external services are introduced.

At the present time, the use of trained models (and machine learning in general) has become widespread in different areas of human activity. Attempts have also been made to use trained models for the storing of personal data of users and for the usage of the personal data of users for various tasks. In one example, trained models based on the personal data of users may be used to predict user preferences in given areas of commerce or other information technologies. In another example, such models can be used as a kind of identifier of users, and so forth. The main benefit of trained models may be that it is impossible to extract from the trained models the personal data based on which the models were trained. Thus, it is possible to use the personal data of a user without disclosing the personal data or transferring the personal data from one computing device to another. The disclosure or transfer of the personal data might have adversely affected information security, if performed.

Some technologies do exist for obtaining access to computing resources using a certain set of actions of a user (basically, parameters characterizing the behavior of the user). In one example, a system exists for enabling to be granted access by performing the following. First, the user who wishes to obtain access to the computing resources listens to a sound fragment. Then, after listening to the sound fragment, the user pronounces what he/she heard. Then, depending on the accuracy of the reproduction of the sound fragment, a decision is made on whether or not to grant, to the user, access to the computing resources.

Although, the technology described above provides functionalities for identifying users by the behavior (actions) of a user, the actions of the user themselves are in no way concealed, and the data (personal data of the user) is transferred for analysis (identification) to other devices (including remote devices)—thereby creating vulnerability to unauthorized (unsanctioned) access.

Thus, there is a need for a more optimal and effective way of identifying a user based on the user's personal data, for selection of a model to describe the user, and for creating individualized content for the user based on the respective personal data of the user without sending the personal data of the user through a network.

SUMMARY

Aspects of the disclosure relate to identification of a user based on the user's personal data, selection of a model to describe the user, and creation of individualized content, more specifically, to systems and methods of for selection of a model to describe a user and for creating individualized content for the user.

In one exemplary aspect, a method is provided for selection of a model to describe a user, the method comprising: creating, by a data creator, data on preferences of the user based on previously gathered data on behaviors of the user and a base model that describes the user, wherein the base model is previously selected from a database of models including a plurality of models, determining, by a data analyzer, an accuracy of the data created on the preferences of the user, wherein the determination is based on observed behaviors of the user, when the accuracy of the data is determined as being less than a predetermined threshold value, selecting, by a model selector, a correcting model related to the base model, and retraining, by a model trainer, the base model so that the accuracy of the data on the preferences of the user is greater than or equal to the predetermined threshold value for the gathered data on behavior of the user, and when the accuracy of the data is determined as being greater than or equal to the predetermined threshold value, selecting, by the model selector, the base model to describe the user.

In one aspect, the database of models contains: at least one base model constituting at least one rule for determining the preferences of the user, and at least one correcting model to describe the user, wherein preferences of the user determined by the correcting model are functionally related to the preferences of the user determined by the base model, and wherein the correcting model constitutes at least one rule for determining the preferences of user which are functionally related to the preferences of the user determined by the base model.

In one aspect, the data on the behaviors of the user describes at least one of: applications with which the user is working, times spent by the user working with said applications, and actions performed by the user while working with said applications; search queries of the user; websites visited by the user, and actions performed by the user on the visited websites; and forms filled out by the user.

In one aspect, the base and correcting models in the database of models are characterized by a predictive efficiency, wherein the predictive efficiency is an indicator that characterizes how accurately a particular model can make the prediction within a given period of time.

In one aspect, the predictive efficiency is provided as a numerical value in a given range.

In one aspect, the two models of the plurality of models form a ring, and wherein when a first model of the ring is the base model, the second model of the ring is the correcting model, and in turn, the first model of the ring is the correcting model for the first model of the ring.

In one aspect, the base model is functionally related to a plurality of correcting models, and wherein at least one of the plurality of correcting models is functionally related to at least another one of the plurality of correcting models.

In one aspect, the gathered data includes the previously gathered data and data gathered when the behavior of the user was being observed.

According to one aspect of the disclosure, a system is provided for selection of a model to describe a user, the system comprising a hardware processor configured to: create, by a data creator, data on preferences of the user based on previously gathered data on behaviors of the user and a base model that describes the user, wherein the base model is previously selected from a database of models including a plurality of models, determine, by a data analyzer, an accuracy of the data created on the preferences of the user, wherein the determination is based on observed behaviors of the user, when the accuracy of the data is determined as being less than a predetermined threshold value, select, by a model selector, a correcting model related to the base model, and retrain, by a model trainer, the base model so that the accuracy of the data on the preferences of the user is greater than or equal to the predetermined threshold value for the gathered data on behavior of the user, and when the accuracy of the data is determined as being greater than or equal to the predetermined threshold value, select, by the model selector, the base model to describe the user.

In one exemplary aspect, a non-transitory computer-readable medium is provided storing a set of instructions thereon for selection of a model to describe a user, wherein the set of instructions comprises instructions for: creating, by a data creator, data on preferences of the user based on previously gathered data on behaviors of the user and a base model that describes the user, wherein the base model is previously selected from a database of models including a plurality of models, determining, by a data analyzer, an accuracy of the data created on the preferences of the user, wherein the determination is based on observed behaviors of the user, when the accuracy of the data is determined as being less than a predetermined threshold value, selecting, by a model selector, a correcting model related to the base model, and retraining, by a model trainer, the base model so that the accuracy of the data on the preferences of the user is greater than or equal to the predetermined threshold value for the gathered data on behavior of the user, and when the accuracy of the data is determined as being greater than or equal to the predetermined threshold value, selecting, by the model selector, the base model to describe the user.

The method and system of the present disclosure are designed to provide personal data security while providing access to services. For instance, the system is designed to provide identification of a user based on the user's personal data, creation of individualized content for the user based on the respective personal data of the user, without sending the personal data of the user through a network.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for selection of a model to describe a user and for creating an individualized content for a user of a service in accordance with aspects of the present disclosure.

Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
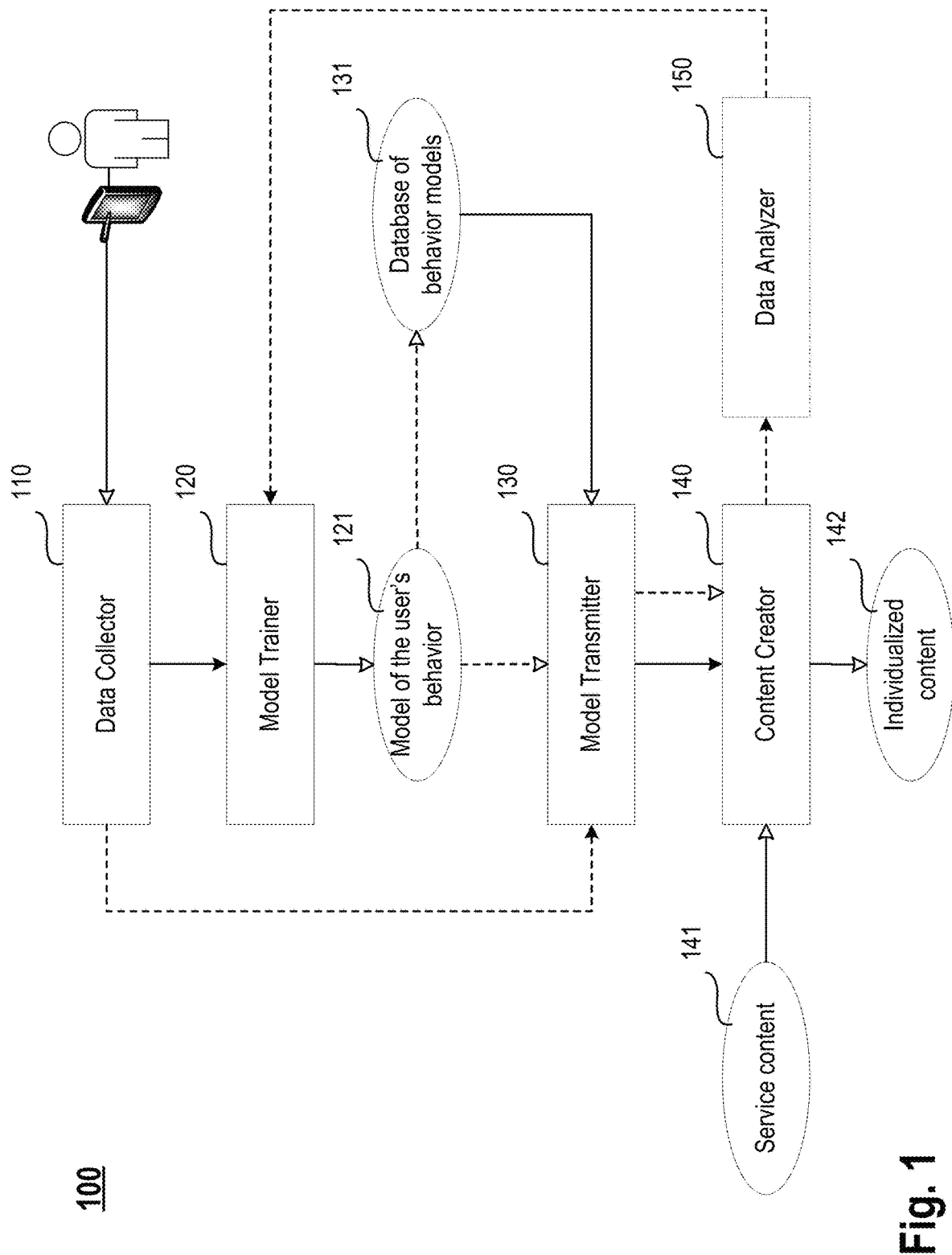
FIG. 1 illustrates a system for creating an individualized content for a user of a service in accordance with aspects of the present disclosure.
Figure 3:
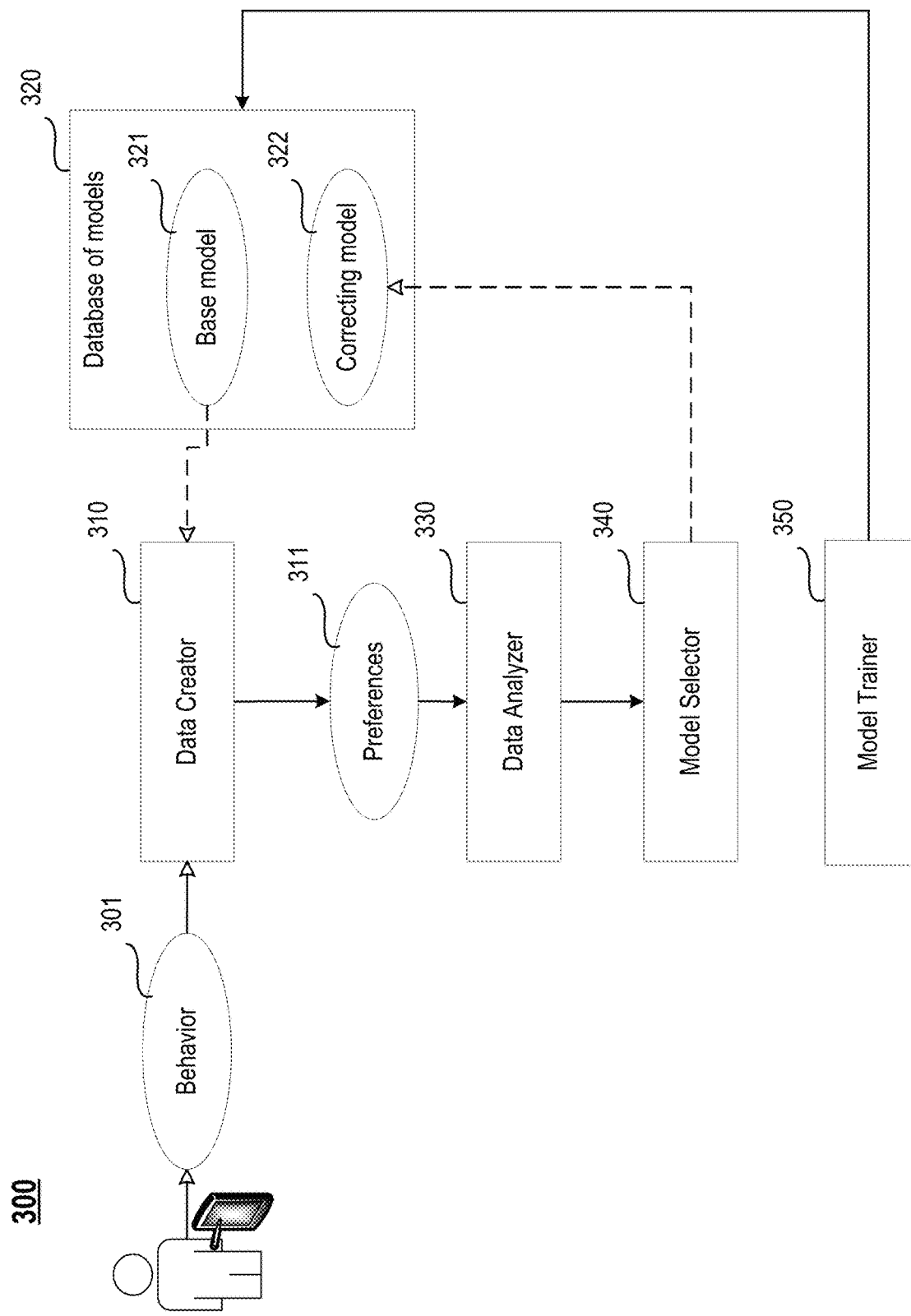
FIG. 3 illustrates a system for selection of a model to describe a user in accordance with aspects of the present disclosure.

FIG. 1 illustrates a system 100 for creating an individualized content for a user of a service in accordance with aspects of the present disclosure. FIG. 3 illustrates a system 300 for selection of a model to describe a user in accordance with aspects of the present disclosure.

In one aspect, the systems 100 and 300 (described below) are implemented on a computing system (e.g., a computer), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 5). Furthermore, the system components may be realized either within a single computing device or spread out among several interconnected computing devices. Although, the systems 100 and 300 are illustrated below on different systems, they may be realized within a single computing device or on spread across any number different computing devices.

The system 100 includes of a data collector 110, a model trainer 120, a model of the user's behavior 121, a model transmitter 130, a database of behavior models 131, a content creator 140, service content 141, individualized content 142, and a data analyzer 150.

The primary purpose of the system for creating individualized content for the user of a service is to create the individualized content of the user from the predefined content of a remote service based on analyzing the activities of the user on his or her computing device.

In one aspect, the system 100 includes at least one of the following:
  as the remote service, an online store; as the service content, the totality of goods (including information about the goods) available in that online store;
  as the remote service, an advertising platform (presenting advertising to users, for example those visiting informational sites); as the service content, advertising blocks (media data advertising the goods and services, such as banner ads);
  as the remote service, a resource providing informational services; as the service content, information, news, and other data blocks sent to the users (by analogy with RSS channels).

The data collector 110 is designed to gather data on the use, by the user, of the computing device and to transmit the gathered data to the model trainer 120.

In one aspect, the computing device of the user comprises at least one of:
  a personal computer;
  a notebook;
  a tablet; and
  a mobile telephone or smartphone.

In one aspect, the computing device comprises a collection of computing devices on which software is running, wherein the collection of computing devices is interconnected by a single user account.

For example, the computing devices may be a personal computer of the user, an iPhone of the user and an iPad tablet, on which software is running, where the devices are connected to remote services under a single account (for example, to YouTube under a single account) or to a single cloud service (for example, based on Handoff technology), i.e., a computing device using Single-Sign-On (SSO) technology.

In another aspect, the data on the behavior of the user includes at least:
  names of the applications with which the user is working, times spent by the user working on in those applications, and actions performed by the user in those applications;
  search queries of the user;
  addresses of sites visited by the user, actions performed by the user on those sites (e.g., links that the user followed, text blocked and copied from pages of the sites, and so forth);
  data from forms filled out by the user;
  information about movements of the mouse cursor, touchpad, and other input devices;
  jumps to other pages from the landing page;
  identifiers of the input means or devices (hardware IDs); and
  identifiers of an application/client.

In one example, the data gathered about the behavior of a user includes requests to voice assistants such as Alice (Yandex Alice), Alexa, Siri, and so forth.

In another example, the data gathered about the behavior of a user includes Google search queries and addresses of websites the user visited after each search query.

In one aspect, the data gathered with the aid of the logging device 110 is further analyzed for the purpose of at least:
  not logging data logging data having a low priority in the creation of the individual content for the user of the service 142 by the content creator 140;
  not logging duplicate data; and
  correcting erroneous data.

In one aspect, the model trainer 120 is designed to train the model of the user's behavior 121 based on the data gathered, and to send the trained model of the user's behavior 121 to the model transmitter 130.

In one aspect, the model of the user's behavior 121 comprises a model based on a neural network with weights being used to predict a subsequent behavior of the user.

For example, the trained model of the user's behavior 121 may be created based on data on search queries of the user such that when that model of the user's behavior 121 is used, it is possible to determine which of a known set of search queries (including modified known search queries, i.e. queries composed on the basis of a combination of several known queries) will be performed by the user in the future with the greatest probability.

In one aspect, the model of the user's behavior 121 is trained such that the model 121 identifies the user with a given level of reliability.

In one aspect, the training of the model of the user's behavior 121 is performed as follows:
  the obtained data on the behavior of the user is parametrized in a form of a vector (for example, a lexical analysis is performed on a speech to convert the speech into words, and the resulting words are then converted into a vector of words);
  the obtained vector of words is cleansed of low-priority information, noise is removed, and so forth; and
  the cleansed vector of words is input into the training algorithm.

For example, for two users working on the same computing device, but performing different actions (working with different applications, performing different search queries, filling out different forms, and so on), different trained models of the user's behavior 121 will be created. The two trained models are unambiguously different from each other, and the degree of their difference characterizes the level of reliability of identification of the user for the given trained model of the user's behavior 121. Different metrics (see below) may be used for comparing these trained models of the user's behavior 121. Moreover, for the same user working at different times on a computing device, similar trained models of the user's behavior 121 are created, such that only a single user will be identified with a given level of reliability.

In one aspect, the model of the user's behavior 121 is trained in advance so as to characterize the behavior of a large group of users. Several different models of the user's behavior 121 may be trained for different groups of users in order to characterize the different groups of users.

In this case, one of those models of the user's behavior 121 is transmitted to the model trainer 120. Such an approach makes reducing the demands on the resources of the computing device of the user possible. The reduction on the demand is possible because what is performed is not the complete training of the model of the user's behavior, but only further training.

In one aspect, pre-trained models of the user's behavior 121 are created at a remote server (i.e., server side), wherein, for each particular user, the individualized content 142 is created depending on the trained model of the respective user's behavior 121.

For example, a service presenting advertising materials (in the form of banner ads on news sites and online stores) creates different trained models of the user's behavior 121, characterizing different groups of users (sportspeople, homemakers, students, and so forth). Depending on which of the partner sites of that service is being visited by a particular user, a corresponding pre-trained model of the user's behavior is sent to its system of creating individualized content for the user of the service (for example, for users visiting an online store of sporting goods, a trained model of the user's behavior 121 will be sent that has been previously trained for the behavior of sportspeople). Such a previously trained model of the user's behavior 121 is attuned (trained) to take account of the search queries of the user on sites with sporting topics and of the use of sporting applications (trackers, pulse meters, etc.), and ignores other data gathered by the data collector 110 (i.e. other data makes little or no contribution to the result of the working of the trained model of the user's behavior).

The model transmitter 130 is designed to send the trained model 121 to the content creator 140.

The model transmitter 130 also verifies the fulfilment the conditions based on which: the trained model of user's behavior 121, the authorization of the user, and so forth, are to be sent (see below).

The database of behavior models 131 contains models of the user's behavior that are assembled upon registration of the user on the service.

For example, an online book selling service may contain a database of registered users, where the registration information sent is not the login and password of the user, but instead a trained model of the user's behavior 121, this model 121 itself having being constructed using software provided by the service, including at least a data collector 110, a model trainer 120 and a model transmitter 130. Thus, after the first visit of the user to the service, and after the trained model of the user's behavior 121 is created and sent to the service, the model is placed in a database of behavior models 131. During further visits of the user to the service, a further trained model of the user's behavior 121 is sent (more precisely, by the model transmitter 130), which might differ from the previously sent model of the user's behavior 121, but not enough to prevent an unambiguous identification of the user on that service (see above).

In one aspect, the model transmitter 130 is at least:
a separate application, intercepting requests of services to provide them with a trained model of the user's behavior 121 as the identifier of the user;
a plugin, installed in the browser and automatically providing a trained model of the user's behavior 121 to a service when a user comes onto the site of that service; and
a script (for example, in the form of JS code), containing elements of the trained model of the user's behavior 121 and embedded on the site of the service.

For example, the model transmitter 130 is a plugin for the browser Google Chrome, which can be installed on the computing device of the user by request of the online book selling store site at the first visit to that site. This plugin sends the created model of the user's behavior 121 as the identifier of the user each time that this site is visited.

In one aspect, the model transmitter 130 sends a trained model of the user's behavior 121 to the content creator 140 at least:
in accordance with a predetermined periodicity; or
based on request received from the content creator 140.

For example, if the user is using a certain software provided by the service, that software (described above) may send to the service updated (further trained) models of the user's behavior 121 with a periodicity of once a day. As a result of this, the user upon visiting the service is at least: 1) always authorized on the service; and/or 2) receives relevant and fresh information, i.e., individualized content 142 of the service (see below).

In one aspect, the model transmitter 130 is additionally designed to authorize a user on a service based on the result of comparing the model of the user's behavior 121 that was sent to the content creator 140 and the models from the database of behavior models 131.

For example, if two users are working on the same computing device, the trained model of the behavior of user No. 1 should differ from the trained model of user No. 2 to the extent that these users can be distinguished with a given level of reliability. If the very same user is working on different computing devices at different times, then the trained model of the user created on the basis of data from computing device No. 1 should be similar to the trained model of the user created on the basis of data from computing device No. 2.

In one aspect, for the comparing of the two models of behavior, the system uses at least one of:
scatter plot matrices;
individual scatter plots; and
tests of statistical significance.

For example, the parameters of a neural network may form the scatter plot.

The method of comparing the two trained behavior models may be an analysis of the result of the application of the two trained behavior models on a previously prepared test sample of data. The test sample may be prepared from a calculation of which actions of the user might (or should) be performed on the given service. For example, the test sample might include the search queries for goods of an online store which users have visited, or search queries for goods and services, for advertising shown to the users, and so forth.

For example, the behavior model for user No. 1 was trained on the search queries of user No. 1 and a certain group of other users, while the behavior model for user No. 2 was trained on the search queries of user No. 2 and a certain group of other users (not necessarily the same that was used for training the behavior model for user No. 1). As a check on how similar the trained behavior models of users No. 1 and No. 2 are, a previously prepared test sample of search queries is input into the models, and at the output the probabilities are calculated of a particular query belonging to the respective user (user No. 1 for the trained behavior model for user No. 1, and user No. 2 for the trained behavior model for user No. 2). A comparison of the results obtained (by any method known in the prior art) determines whether those behavior models for the users are similar or different.

The content creator 140 is designed to create individual content for the user of the service 142 based on a predetermined environment of the service content 141, taking into account the model of user's behavior 121 provided to the content creator 140 by the model transmitter 130.

In one aspect, the given environment of the service content 141 is at least one of:
- a list of goods and services to which access may be provided to the user, access to a good being understood to mean the providing of information to the user about the good or service and the possibility of ordering the good or service, including purchasing (paying for) the good or service ordered; and
- data to which access is granted to the user on the basis of an analysis of the model of user's behavior 121 provided by the model transmitter 130.

For example, a user goes to a service for selling of household appliances online, after which the model transmitter 130 sends, to the service, a model of the user's behavior 121 trained on search queries of the user. Afterwards, the trained model of the user's behavior 121 will be used to identify the user and authorize the user on the given service. Then, based on the trained model of user's behavior 121 provided to the service and the previously prepared search queries for the goods offered by the online sales service, which of the goods have a higher priority for that user (first of all the goods for which search queries are made, accompanying goods, and so forth) are determined, and catalogs and price lists are created for the user based on the determined goods.

Thus, the user is provided with certain information prepared in advance based on his or her personal data (for example, search queries), without providing the search queries themselves to the service, but only the model of the user's behavior 121 trained on those search queries, which in turn increases the information security of the personal data of the user.

In another example, the service comprises contextual advertising that is being provided to users through various platforms (websites with different themes: news sites, forums, online stores, and so forth). For more precise operations of the service, i.e. in order to select more relevant advertising for each particular user, it may be necessary to analyze the user's data. For example, it may be necessary to analyze data about: the behavior of the user on the computing device, the behavior of the user in the network, which applications are being used by the user, which queries are being made, which websites are being visited, and so forth. The main problems addressed by the method of the present disclosure are improvements in providing data security to the user while enabling the service to be provided. In other words, the technical issues are raised in operations of the service due to the gathering of that data of the user. For instance, on one hand, the gathering of most data without the consent of the user is unlawful. On the other hand, the gathering of data with the consent of the user may still result in an unauthorized access to the gathered data, and in unacceptable risks to the reputation and financial situation of the user. Therefore, the method of the present disclosure addresses these problems by enabling the service to be provided using a model of the user's behavior 121 trained on the computing devices of the user. Such a model does not contain the data of the user (including personal data), yet this can be used for the identification of the user, and for the prediction of his or her behaviors, interests, and so forth.

In some scenarios, the usage of trained models of the user's behavior 121 may cause high demands on computing resources of the computing device of the user. For instance, if the training of the model of the user's behavior on the computing device of the user is performed in real time mode, the training activity may affect the operations of the computing device and/or the operations of the applications being used by the user in a manner that is noticeable to the user. For example, the computing device of the user may run more slowly, more RAM might be used, and the autonomous operating time of the computing device (e.g., mobile device) may be lower when the training of a model of the user's behavior 121 is taking place on the computing device of the user.

In order to address the aforementioned problems, the method of the present disclosure uses previously trained models of the user's behavior 121, thereby requiring only slight further training for their use (i.e., retraining prior to use). Such an approach solves all of the aforementioned problems and achieves the following:
- the user is provided with a model of the user's behavior 121, designed for the creation of individualized content 142 for the user of a particular service, thereby significantly improving the accuracy of the creation of that individualized content 142;
- the training (further training) of the model of the user's behavior 121 is performed without resulting in a transfer of the user's data to entities outside the computing device (for example, through a computer network to a specialized service), thereby increasing the information security of the user's data; and
- a further training of the model of the user's behavior 121 is performed, rather than a complete training of the model of the user's behavior 121, thereby lessening demands on the computing resources of the computing device of the user.

In the above-described example of an advertising agency, different pre-trained models of the user's behavior 121 are used for different platforms (sites). For example, for news sites, the models are pre-trained to take account of the search queries of the users for news of interest to them, to determine which topics are of greatest interest to the users, and so forth. Similarly, on sports sites, the models are pre-trained to take account of the sporting applications used on the computing devices of the users, and so forth. Such models of the user's behavior 121 are delivered to the users as identifiers for visiting the corresponding sites (for example, to obtain individual news items, for accessing forums, personal accounts, and so forth), and are then provided by the users to the respective websites (when going onto the websites, for example, with the aid of special plugins installed in the browsers), and thereafter provided by the websites to the advertising agency (service). Then, based on the fully trained models of the user's behavior 121, the advertising agency determines which particular advertisings are to be shown to the particular user.

In another aspect, in addition, different advertising agencies (different services) may exchange those trained and pre-trained models of the user's behavior 121 among themselves in order to increase the accuracy of creating the individualized content for the user of a particular web site.

The data analyzer 150 is designed to gather data on actions of a user on a service, to analyze statistics on the actions of a user on a service based on the gathered data, and to make a decision on the need to retrain the model of the user's behavior 121.

Based on which actions are performed by a user (for example, which goods are of interest, which purchases are made, and so forth), it is possible to make a decision as to the need for retraining or further training of the model of the user's behavior 121. The retraining is performed in order to create more relevant content of the service 142 for the user during subsequent visits to the service. The time spent on the service, the number of orders placed or rejected, the number of messages to customer support, and so forth may serve as a quantitative characteristic for assessing relevancy.

In one aspect, the model of the user's behavior 121 may be created (trained) by retraining a partially trained model. For example, the retraining may not be a complete training, but rather a retraining of an already formed, partially trained model of the behavior of a "universal" user. For example, in the case, when the trained model of the user's behavior 121 is a neural network, the further training may involve correcting the weights of the layers of that neural network based on data received from the content creator 140.

For example, in the case when the service is an online store, at the first visit of the user to the website of the online store, depending on the actions the user performs on the website (for example, which catalogs are viewed, which goods are searched for, and so forth), the user is provided an already pre-trained model of the user's behavior 121. In order to access their personal account in the online store, the user is provided as an ID the already pre-trained model of user's behavior 121. The already pre-trained model of the user's behavior 121 takes into account certain search queries already performed by the user and is attuned to a more accurate prediction of what is needed by that user in the online store. For instance, the preliminary training of the model of the user's behavior 121 has taken into account the behavior of a large group of people with similar queries. Therefore, on one hand, this model of the user's behavior 121 is suitable to a large number of users, and on the other hand, when creating the individual content for the user of that online store, the use of such a model of the user's behavior 121 may produce less correct results. Therefore, it is advantageous to further train the provided model of the user's behavior 121 on the computing device of the user. Consequently, the demands on the computing resources of the computing device of the user are partly reduced, and the training of the model of the user's behavior is speed up because it is not necessary to perform the full cycle of training, which would otherwise require more computing resources, larger training samples, and so forth. If the same originally trained model of the user's behavior 121 is provided to two different users, the models provided to the two different users will be different after further training on the respective computing devices of the two different users, wherein the further trainings on the respective computing devices depend on the actions of the respective users (see above).

Figure 2:
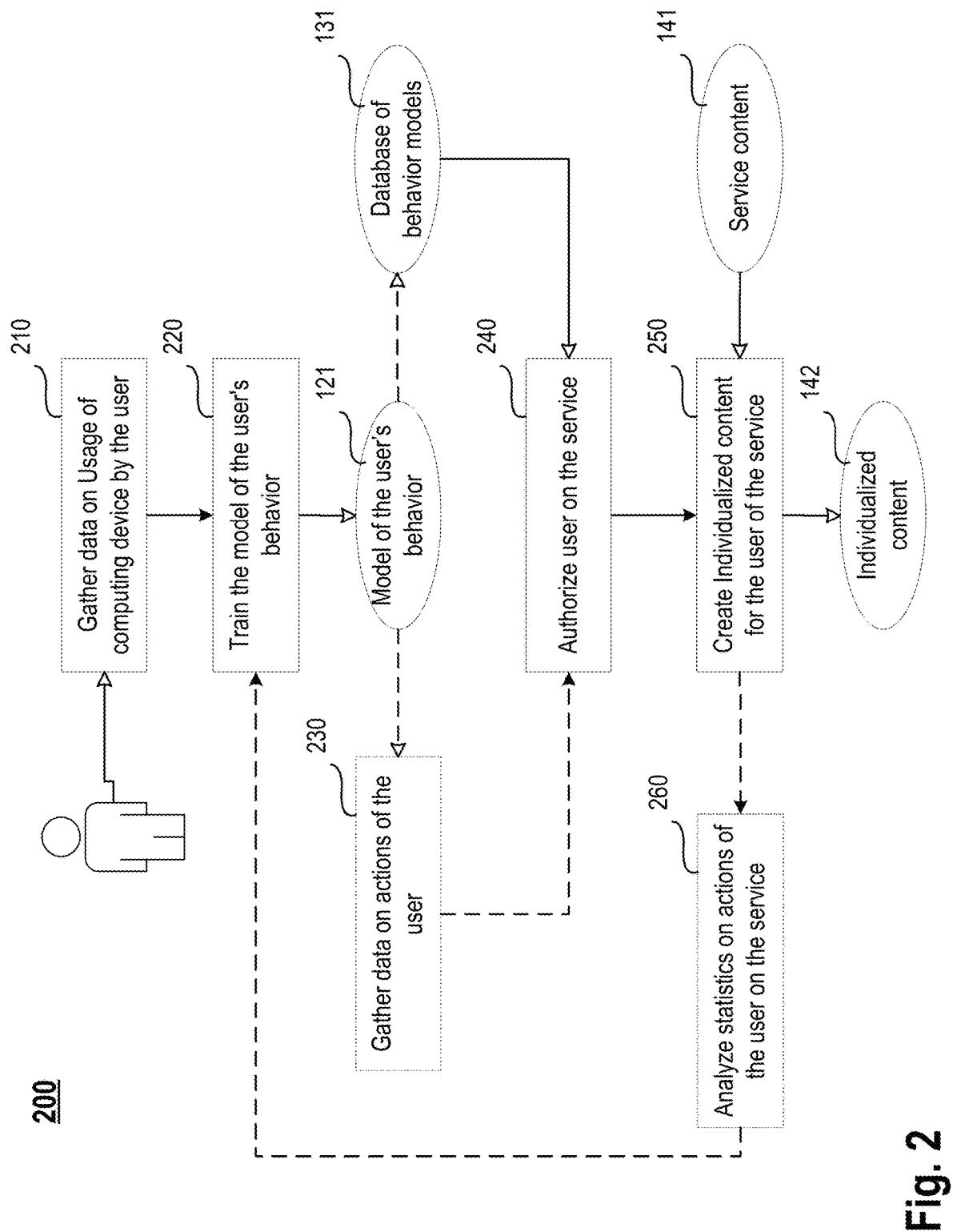
FIG. 2 illustrates an exemplary method for creating an individualized content for a user of a service in accordance with aspects of the present disclosure.

FIG. 2 illustrates an exemplary method 200 for creating an individualized content for a user of a service in accordance with aspects of the present disclosure. The method for creating the individualized content for the user of a service contains: a step 210 during which data is gathered on usage of a computing device by the user, a step 220 during which the model of the user's behavior is trained, a step 230 during which data is gathered on the actions of the user, a step 240 during which the user is authorized on the service, a step 250 during which the individual content of the user is created, and a step 260 during which statistics on the actions of the user on the service are analyzed.

In step 210, method 200 gathers, by the data collector 110, data on usage of a computing device by the user.

In step 220, method 200, trains, by the model trainer 120, the model of the user's behavior 121 based on the data gathered on the usage of the computing device by the user (i.e., based on data gathered in step 210). The training is performed so that the model identifies the user with a given level of reliability. The trained model is then provided to the data analyzer 150. In addition, the trained model is stored in the database of behavior models 131.

In step 230, method 200, gathers, by the data analyzer 150, data on actions of the user on the service.

In step 240, method 200, by the model transmitter 130, authorizes the user on the service (i.e., to access the service) based on result of a comparison of the model of the user's behavior 121 presented during step 220 and one or more behavior models of user obtained from a database of behavior models 131, and provides to a content creator 140, the model of the user's behavior 121.

In step 250, method 200, by the content creator 140, creates individualized content for the user of the service 142 based on a predetermined environment of the service content 141 and the model of the user's behavior 121 received from the model transmitter 130.

In step 260, method 200, by the data analyzer 150, analyzes statistics on actions of the user on the service and based on the data gathered on the actions of the user on the service (i.e., based on data gathered in step 230), and determines whether or not there is a need to retrain the model of the user's behavior 121.

FIG. 3 illustrates a system 300 for selection of a model to describe a user in accordance with aspects of the present disclosure.

The system 300 for selection of a model to describe a user consists of a data creator 310, a database of models 320, data analyzer 330, a model selector 340, and a model trainer 350.

The data creator 310 is designed to create data on preferences of a user (hereinafter, the preferences 311) based on: previously gathered data on behaviors of the user (hereinafter, the data on the behavior of the user, 301) and a model to describe the user previously selected from a database of models 320 (hereinafter, the base model 321).

In one aspect, the database of models 320 contains:
  at least one base model 321 constituting at least one rule for determining the preferences of the user, and
  at least one correcting model 322 to describe the user, wherein the preferences of the users determined by the correcting model are functionally related to the preferences of the users determined by the base model 321, and wherein the correcting model 322 constitutes at least one rule for determining the preferences of users which are functionally related to the preferences of the users determined by the base model.

The models to describe the user (i.e., the base model 321 and the correcting model 322) can be used as the model of the user's behavior 121 described in FIG. 1. In that case, the database of models 320 is the database of behavior models 131. Such models to describe a user 321 and 322 can be used to create the individualized content for the user of a particular service. As such, the accuracy of the created individualized content for the particular user increases (essentially increasing the efficiency).

In one aspect, the data on the behavior of the user 301 describes at least one of:
  applications with which the user is working, times spent by the user working with those applications, and actions performed by the user while working with those applications;
  search queries of the user;
  websites visited by the user, and actions performed by the user on the visited websites; and
  forms filled out by the user.

For example, the applications may be browsers for Internet surfing, electronic documentation software, such as OpenOffice, applications for taking photos and videos, and so forth.

In another example, the search queries may be data sent by a browser to predetermined search websites, such as google.com.

In one aspect, the models to describe the user (at least the base model 321 and/or the correcting model 322) are previously trained so that the models identify the user with a given level of reliability.

In one aspect, the models to describe the user (at least the base model 321 and/or the correcting model 322) are characterized by a predictive efficiency. The predictive efficiency serves as an indicator characterizing how accurately the particular model can predict, within a given period of time, at least:
  actions of the user on the computing device of the user on which the system is operating;
  resources being used on the computing device of the user; and
  individual content being created by the services based on at least: the actions of the user (see e.g., FIG. 1), and the preferences of the user.

In one aspect, the predictive efficiency comprises a numerical value in a given range, e.g., in a range from 0 (the predictions of the model as to the actions or preferences of the user are random in nature) to 1 (the model accurately predicts given actions or preferences of the user).

For example, if the actions of the user involve launching an application A or an application B, then a zero predictive efficiency would mean that the user selects application A or B entirely at random.

In one aspect, the base model 321 is a correcting model 322 for a model which is itself a correcting model for the base model 321.

For example, the base model 321 and the correcting model 322 may form a ring of a base model→a base model correcting the model→ . . . . In this case, the selection of a model to describe a user may be carried out as follows: a base model 321 is selected, the base model 321 is trained, and as a result a correcting model 322 is selected, the correcting model 322 is trained and a base model 321 is selected, and so forth. In the case, when models can be sent through a computer center to different users, one user may use a base model 321 and correcting model 322 trained by other users in such a ring, which in turn increases the predictive efficiency of such models.

In one aspect, when two models of the plurality of models form a ring, then, when a first model of the ring is the base model, the second model of the ring is the correcting model, and in turn, the first model of the ring is the correcting model for the first model of the ring.

In one aspect, the base model 321 is functionally related to a plurality of correcting models 322, wherein at least one of the plurality of correcting models 322 is functionally related to at least another one of the plurality of correcting models 322.

For example, the base model 321 and the correcting models 322 may form a tree, where the correcting models 322 constitute child nodes, and the base model 321 is a parent node. In this case, the selection of a model to describe a user may be carried out as follows: a base model 321 is chosen, the base model 321 is trained, and as a result a correcting model 322 is chosen, that correcting model 322 is trained, and the next correcting model 322 is chosen, and so on. In the event that the models can be sent through a computer center to different users, one user may use a base model 321 and correcting model 322 trained by other users in such a tree, which in turn increases the predictive efficiency of such models.

The correcting model 322 is designed to correct inaccuracies of the working of the base model 321, due to the fact that the base model 321 is designed for predictions in a broader area of user interests than the correcting model 322, while the correcting model 322 is designed for more accurate predictions in a narrower area of user interests.

The data analyzer 330 is designed to determine the accuracy of the created preferences 311 based on the observed behavior of the user.

In one aspect, the accuracy of the created preferences comprises a numerical value from 0 (not a single one of the preferences of the user is correctly determined) to 1 (all of the preferences of the user are correctly determined).

For example, based on the behavior of a user, the service presents to the user a set of goods which the user could acquire. If any of the goods offered meets the interests of the user and the user is willing to acquire it (even if this is not done afterwards), this increases the accuracy of the created preferences. If the user is willing to acquire all the goods offered to him or her, the accuracy of the preferences is equal to 1; if the user is not willing to acquire the goods offered (i.e., is totally disinterested in acquiring them), the accuracy of the preferences is equal to 0.

In one aspect, the accuracy of the preferences is calculated based on feedback received from the user.

For example, in the preceding example, the user could mark every item offered as meeting or not meeting his or her preferences, and depending on the markings, the model used to describe the user can be retrained (using the model trainer 350), wherein the retraining is used to provide more accurate prediction for subsequent access to the service. In other words, next time an already more accurate prediction of the preference of the user is made based on the very same data.

The model selector 340 is designed to select a correcting model 322 related to the base model 321 in the event that the accuracy of the model describing the user is less than a predetermined threshold value.

In one aspect, the model that is already being used for describing the user may be selected.

For example, if the accuracy of the model determined is higher than a predetermined threshold value, the very same base model 321 may again be selected when using the base model 321 or the very same correcting model 322 may again be selected when using one of the correcting models 322.

The model trainer 350 is designed to retrain the base model 321 so that the accuracy of the preferences 311 for the gathered behavior 301 becomes higher than a predetermined threshold value. The retraining is performed in the event that the accuracy of the preferences 311 is not higher than the predetermined threshold value.

In one aspect, the model trainer 350 may be the model trainer 120 described in FIG. 1.

In the general case, the selection of the model to describe the user results in a more effective evaluation of the behavior of the user (or evaluation of the description of the user), and the obtained results (expressed in the individual content for the user of the service) become more fitting for that user.

An exemplary scenario illustrating the operations of the system of the present disclosure for selecting the model describing a user is presented as follows:

First, a software for gathering data about a user's behavior is installed on a mobile device of the user. The gathered data may be about network activity, actions performed on the mobile device, and so forth. Then, the software trains the models (further training and/or retraining) to describe the user based on the data gathered about the user's behavior. At the same time, this software uses one of the user description models provided by a particular computer center—a third party supporting the functioning of the service used by the user, e.g., as described in FIG. 1. That is, the computer center, in one aspect of the system, contains the database of behavior models 131 (in particular, the database of models 320). Then, the computer center presents models to the users and the services, including previously trained models, and stores the trained models obtained from the users and the services in this database (see below).

For example, initially the software on the mobile device of the user may be working with a model to describe the user which is designed to determine what exactly the user is most interested in on the mobile device (Internet surfing, working with documents, calls, taking photos or videos, and so forth). This model to describe the user (hereinafter, model No. 1) is constantly trained as the user uses the mobile device, thereby increasing its predictive efficiency (i.e., model No. 1 can more accurately describe what the user will be interested in during a given period of time). Such a trained model No. 1 will be afterwards sent to a computer center, from which the trained model No. 1 may be sent to another user having parameters similar to those of the given user (see FIG. 1), or to another service (for subsequently sending to a user making use of that service). Thus, the next user will begin working with an already previously prepared, and consequently more effective model to describe the user. Returning to the first user: after model No. 1 has achieved a certain predictive efficiency and has begun to show that the user is mainly interested in Internet surfing, in place of model No. 1 (which was essentially the base model 321) the user is presented with a new model to describe a user (hereinafter, model No. 2), wherein the model No. 2 is designed to determine interests during Internet surfing (being essentially a correcting model 322). Model No. 2 is functionally related to model No. 1, since it describes more thoroughly one of the areas in which model No. 1 operates.

Working with model No. 2 is analogous to working with model No. 1, only in its given area of application: it is likewise constantly trained depending on the actions of the user (i.e., depending on which sites are visited and which search queries are performed). Model No. 2 may also be sent afterwards to a computer center for sending to another user or service and for obtaining the next model. After a certain time, instead of model No. 2, the user receives from the computer center a new model, designed to determine which goods the user views most often on the most visited resources (hereinafter, model No. 3); this model (analogous to model No. 1 and model No. 2) is also constantly trained, increasing its predictive efficiency.

And this same model may be used in the system for creating of individualized content for the user of a service (see FIG. 1). Subsequently, after model No. 3, the user may be sent model No. 1 again, but now retrained on other users and having even greater predictive efficiency than the model No. 1 which the user had first received.

In yet another example, trained models may be presented by a computer center to the services (for example, websites for determining which content should be created for a particular user). In this case, the entire process described above may be performed at least:

entirely on the part of the services, where one trained model may be used for each user, and the same trained model may be used for several users; and together on the part of the user (where the training of the model occurs) and on the part of the service, where the model is used to create the individualized content of the service.

Figure 4:
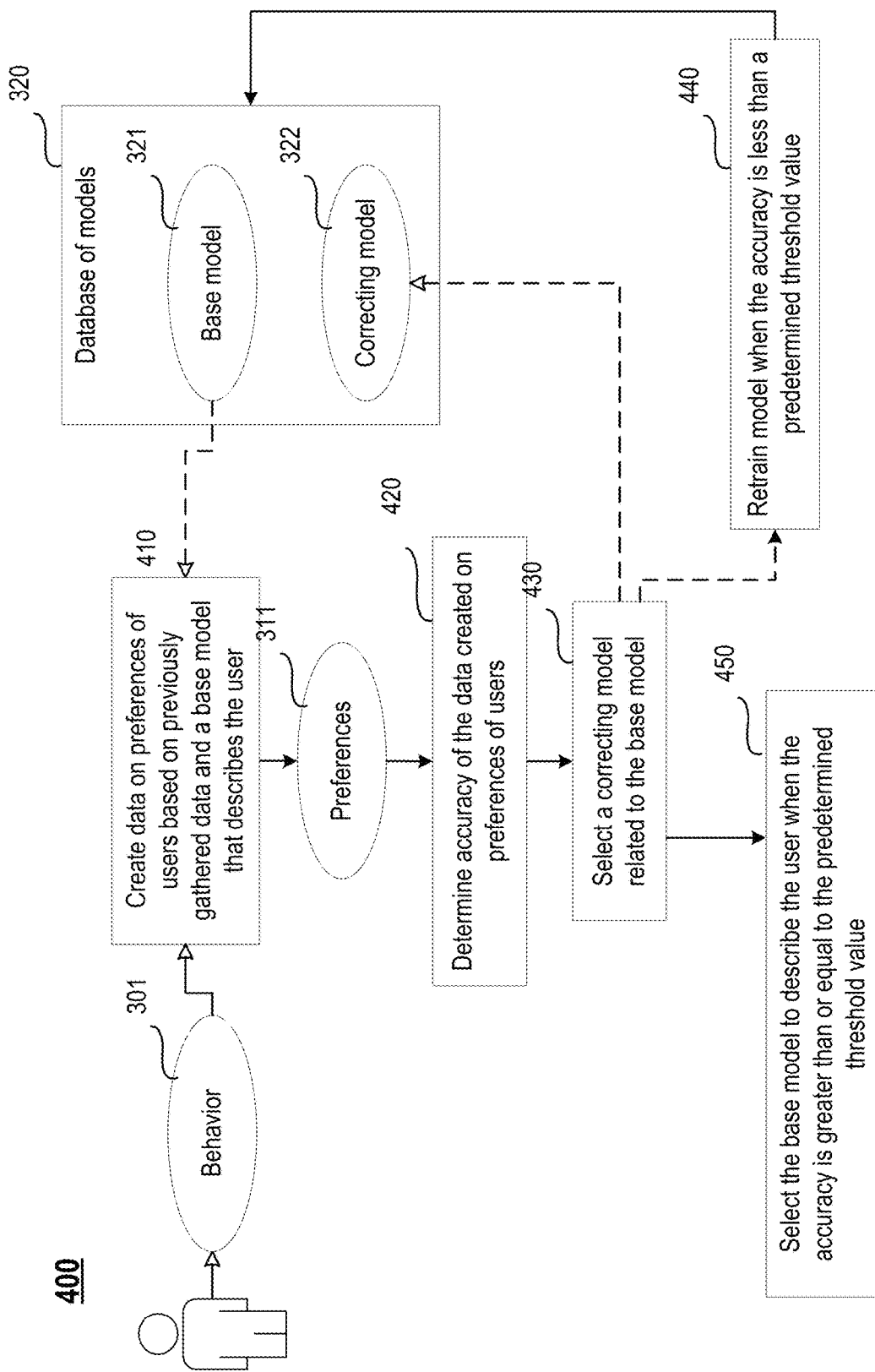
FIG. 4 illustrates an exemplary method for selection of a model to describe a user in accordance with aspects of the present disclosure.

FIG. 4 illustrates an exemplary method 400 for selection of a model to describe a user in accordance with aspects of the present disclosure. The method 400 for selection of the model to describe the user contains: a step 410 during which data are created, a step 420 during which the accuracy is determined, a step 430 during which a correction model is selected when an accuracy is determined as being below a predetermined threshold, a step 440 during which the model is retrained, and a step 450 during which a base model is selected.

In step 410, by the data creator 310, method 400 creates data on preferences of the user (hereinafter, the preferences 311) based on previously gathered data on usage of a computing device by the user (hereinafter, the behavior 301) and a base model that describes the user, wherein the base model is previously selected from a database of models 320 (hereinafter, the base model 321) that includes a plurality of models.

In one aspect, the database of models 320 contains:
at least one base model 321 constituting at least one rule for determining the preferences of the user, and
at least one correcting model 322 to describe the user, wherein the preferences of the users determined by the correcting model are functionally related to the preferences of the users determined by the base model 321, and wherein the correcting model 322 constitutes at least one rule for determining the preferences of users which are functionally related to the preferences of the users determined by the base model.

In step 420, by the data analyzer 330, method 400 determines the accuracy of the data created on the preferences of the user 311, wherein the determination of the accuracy is based on observed behaviors of the user. That is, while the user is performing actions, the data on the behavior of the user is gathered and is used for analyzing the accuracy of the data on preferences of the user (i.e., the accuracy of the data created in step 410).

In step 430, when the accuracy of the data is determined as being less than a predetermined threshold value, method 400 selects, by the model selector 340, a correcting model 322 related to the base model 321.

In step 440, when the accuracy of the data is determined as being less than a predetermined threshold value, method 400 retrains the base model 321, by the model trainer 350 so that the accuracy of the preferences is greater than or equal to the predetermined threshold value for the gathered data on behavior of the user, wherein the gathered data includes the previously gathered data (data used in step 410) and data gathered when the behavior of the user was being observed (data gathered for the analysis in step 420).

In step 450, when the accuracy of the data is determined as being greater than or equal to the predetermined threshold value, method 400 selects, by a model selector, the base model to describe the user.

Figure 5:
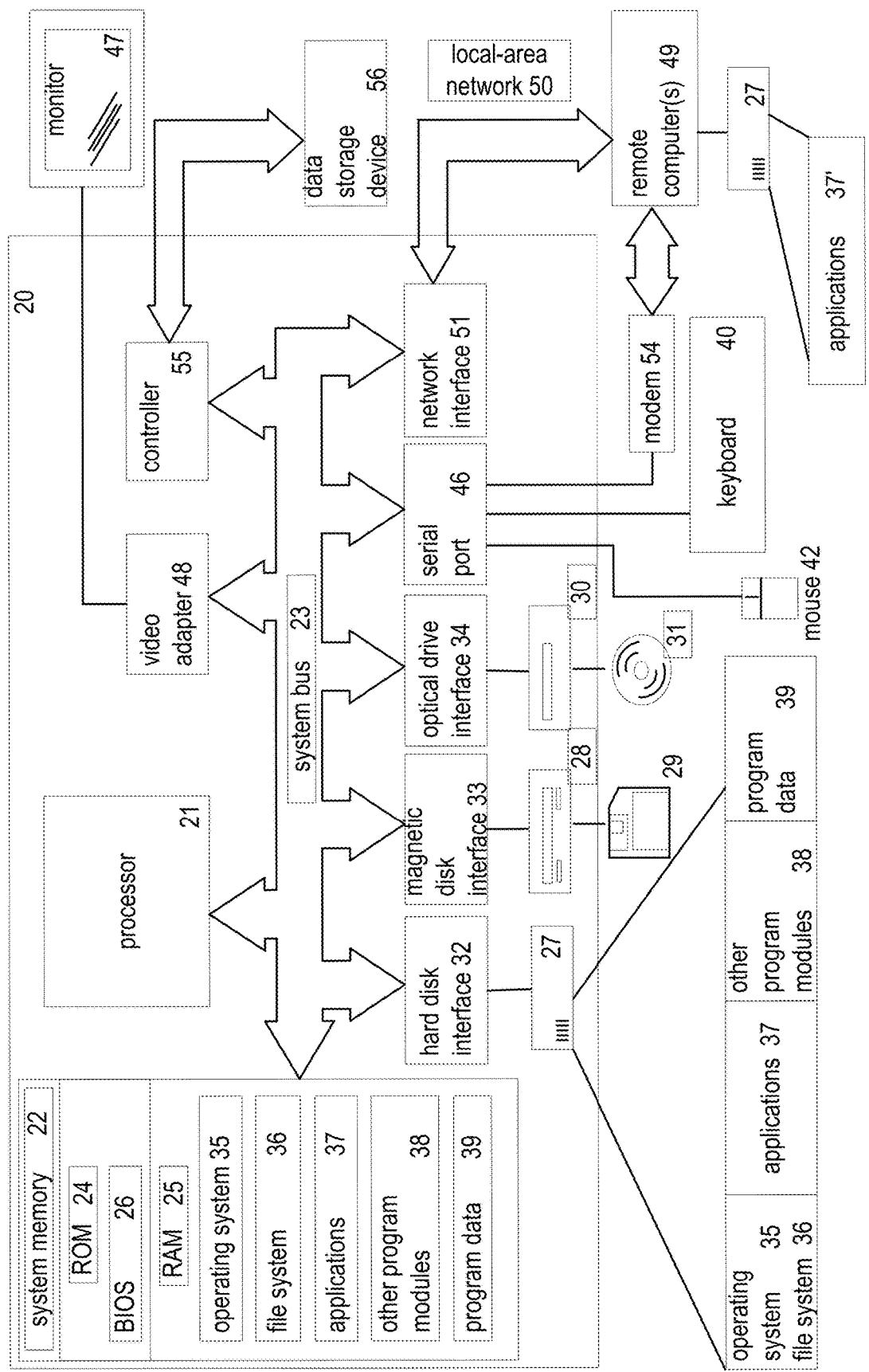
FIG. 5 presents an example of a general purpose computer system on which aspects of the present disclosure can be implemented.

FIG. 5 is a block diagram illustrating a computer system 20 on which aspects of systems and methods for selection of a model to describe a user and for creating an individualized content for a user of a service that may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for selection of a model to describe a user that is implemented by a hardware processor, the method comprising the hardware processor:
    creating, by a data creator, data on preferences of the user based on previously gathered data on usage of a computing device by the user and a base model that describes the user, wherein the base model is previously selected from a database of models including a plurality of models;
    determining, by a data analyzer, an accuracy of the data created on the preferences of the user, wherein the determination is based on observed behaviors of the user;
    when the accuracy of the data is determined as being less than a predetermined threshold value, selecting, by a model selector, a correcting model related to the base model, and retraining, by a model trainer, the base model so that the accuracy of the data on the preferences of the user is greater than or equal to the predetermined threshold value for the gathered data on behavior of the user, wherein the base model and correcting model in the database of models are characterized by a predictive efficiency, and wherein the predictive efficiency is an indicator that characterizes how accurately a particular model can make the prediction within a given period of time; and
    when the accuracy of the data is determined as being greater than or equal to the predetermined threshold value, selecting, by the model selector, the base model to describe the user.

2. The method of claim 1, wherein the database of models contains:
    at least one base model constituting at least one rule for determining the preferences of the user, and at least one correcting model to describe the user,
    wherein preferences of the user determined by the correcting model are functionally related to the preferences of the user determined by the base model, and
    wherein the correcting model constitutes at least one rule for determining the preferences of user which are functionally related to the preferences of the user determined by the base model.

3. The method of claim 1, wherein the data on the behaviors of the user describes at least one of:
    applications with which the user is working, times spent by the user working with said applications, and actions performed by the user while working with said applications;
    search queries of the user;
    websites visited by the user, and actions performed by the user on the visited websites; and
    forms filled out by the user.

4. The method of claim 1, wherein the predictive efficiency is an indicator that characterizes how accurately the particular model can make the prediction within a given period of time, for predicting at least one of: actions of the user on the computing device of the user on which the system is operating, resources being used on the computing device of the user, and individual content being created by services based on at least actions of the user and the preferences of the user.

5. The method of claim 4, wherein the predictive efficiency is provided as a numerical value in a given range.

6. The method of claim 1, wherein two models of the plurality of models form a ring, and wherein when a first model of the ring is the base model, the second model of the ring is the correcting model, and in turn, the first model of the ring is the correcting model for the first model of the ring.

7. The method of claim 1, wherein the base model is functionally related to a plurality of correcting models, and wherein at least one of the plurality of correcting models is functionally related to at least another one of the plurality of correcting models.

8. The method of claim 1, wherein the gathered data includes the previously gathered data and data gathered when the behavior of the user was being observed.

9. A system for selection of a model to describe a user, comprising:
    at least one processor configured to:
        create, by a data creator, data on preferences of the user based on previously gathered data on usage of a computing device by the user and a base model that describes the user, wherein the base model is previously selected from a database of models including a plurality of models;
        determine, by a data analyzer, an accuracy of the data created on the preferences of the user, wherein the determination is based on observed behaviors of the user;
        when the accuracy of the data is determined as being less than a predetermined threshold value, select, by a model selector, a correcting model related to the base model, and retrain, by a model trainer, the base model so that the accuracy of the data on the preferences of the user is greater than or equal to the predetermined threshold value for the gathered data on behavior of the user, wherein the base model and correcting model in the database of models are characterized by a predictive efficiency, and wherein the predictive efficiency is an indicator that characterizes how accurately a particular model can make the prediction within a given period of time; and
        when the accuracy of the data is determined as being greater than or equal to the predetermined threshold value, select, by the model selector, the base model to describe the user.

10. The system of claim 9, wherein the database of models contains:
    at least one base model constituting at least one rule for determining the preferences of the user, and at least one correcting model to describe the user,
    wherein preferences of the user determined by the correcting model are functionally related to the preferences of the user determined by the base model, and
    wherein the correcting model constitutes at least one rule for determining the preferences of user which are functionally related to the preferences of the user determined by the base model.

11. The system of claim 9, wherein the data on the behaviors of the user describes at least one of:
    applications with which the user is working, times spent by the user working with said applications, and actions performed by the user while working with said applications;
    search queries of the user;
    websites visited by the user, and actions performed by the user on the visited websites; and
    forms filled out by the user.

12. The system of claim 9, wherein the predictive efficiency is an indicator that characterizes how accurately the particular model can make the prediction within a given period of time, for predicting at least one of: actions of the user on the computing device of the user on which the system is operating, resources being used on the computing device of the user, and individual content being created by services based on at least actions of the user and the preferences of the user.

13. The system of claim 12, wherein the predictive efficiency is provided as a numerical value in a given range.

14. The system of claim 9, wherein two models of the plurality of models form a ring, and wherein when a first model of the ring is the base model, the second model of the ring is the correcting model, and in turn, the first model of the ring is the correcting model for the first model of the ring.

15. The system of claim 9, wherein the base model is functionally related to a plurality of correcting models, and wherein at least one of the plurality of correcting models is functionally related to at least another one of the plurality of correcting models.

16. The system of claim 9, wherein the gathered data includes the previously gathered data and data gathered when the behavior of the user was being observed.

17. A non-transitory computer readable medium storing thereon computer executable instructions that, when executed by a hardware processor, cause the hardware processor to perform selection of a model to describe a user, including instructions for:
    creating, by a data creator, data on preferences of the user based on previously gathered data on usage of a computing device by the user and a base model that describes the user, wherein the base model is previously selected from a database of models including a plurality of models;
    determining, by a data analyzer, an accuracy of the data created on the preferences of the user, wherein the determination is based on observed behaviors of the user;
    when the accuracy of the data is determined as being less than a predetermined threshold value, selecting, by a model selector, a correcting model related to the base model, and retraining, by a model trainer, the base model so that the accuracy of the data on the preferences of the user is greater than or equal to the predetermined threshold value for the gathered data on behavior of the user, wherein the base model and correcting model in the database of models are characterized by a predictive efficiency, and wherein the predictive efficiency is an indicator that characterizes how accurately a particular model can make the prediction within a given period of time; and
    when the accuracy of the data is determined as being greater than or equal to the predetermined threshold value, selecting, by the model selector, the base model to describe the user.

18. The non-transitory computer readable medium of claim 17, wherein the database of models contains:
    at least one base model constituting at least one rule for determining the preferences of the user, and at least one correcting model to describe the user,
    wherein preferences of the user determined by the correcting model are functionally related to the preferences of the user determined by the base model, and
    wherein the correcting model constitutes at least one rule for determining the preferences of user which are functionally related to the preferences of the user determined by the base model.

19. The non-transitory computer readable medium of claim 17, wherein the data on the behaviors of the user describes at least one of:
- applications with which the user is working, times spent by the user working with said applications, and actions performed by the user while working with said applications;
- search queries of the user;
- websites visited by the user, and actions performed by the user on the visited websites; and
- forms filled out by the user.

20. The non-transitory computer readable medium of claim 17, wherein the predictive efficiency is an indicator that characterizes how accurately the particular model can make the prediction within a given period of time, for predicting at least one of: actions of the user on the computing device of the user on which the system is operating, resources being used on the computing device of the user, and individual content being created by services based on at least actions of the user and the preferences of the user.

21. The non-transitory computer readable medium of claim 20, wherein the predictive efficiency is provided as a numerical value in a given range.

22. The non-transitory computer readable medium of claim 17, wherein two models of the plurality of models form a ring, and wherein when a first model of the ring is the base model, the second model of the ring is the correcting model, and in turn, the first model of the ring is the correcting model for the first model of the ring.

23. The non-transitory computer readable medium of claim 17, wherein the base model is functionally related to a plurality of correcting models, and wherein at least one of the plurality of correcting models is functionally related to at least another one of the plurality of correcting models.

24. The non-transitory computer readable medium of claim 17, wherein the gathered data includes the previously gathered data and data gathered when the behavior of the user was being observed.

* * * * *